Figure 1:
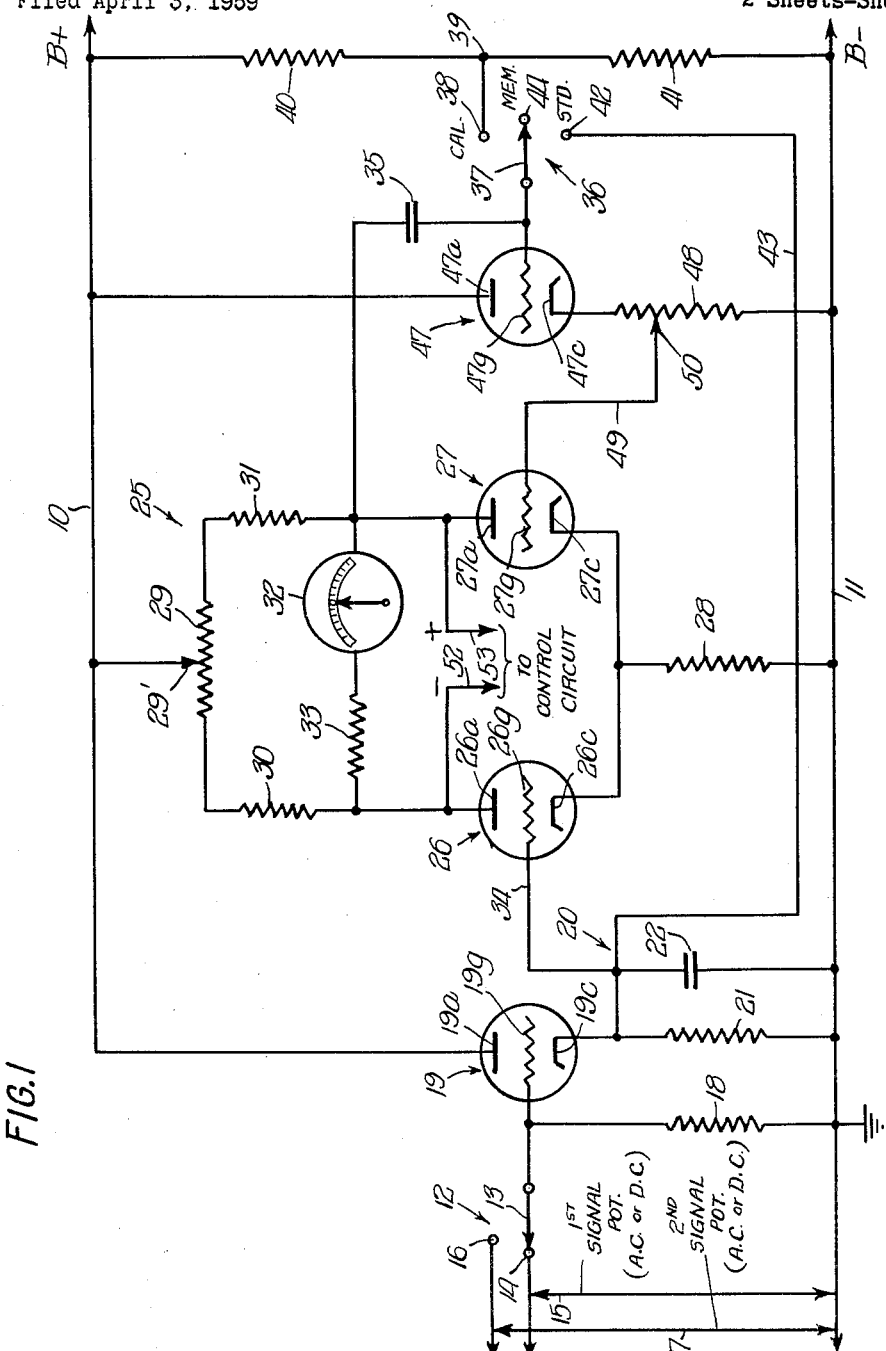

July 18, 1961 L. C. KELSEY 2,993,171
ELECTRONIC MEASURING SYSTEM
Filed April 3, 1959 2 Sheets-Sheet 2

INVENTOR
LAWRENCE C. KELSEY

BY *Cromwell, Greist & Warden*
ATTORNEY

United States Patent Office 2,993,171
Patented July 18, 1961

2,993,171
ELECTRONIC MEASURING SYSTEM
Lawrence C. Kelsey, Chicago, Ill., assignor to W. M. Welch Manufacturing Company, Chicago, Ill., a corporation of Illinois
Filed Apr. 3, 1959, Ser. No. 804,048
8 Claims. (Cl. 324—98)

This invention relates to electronic measuring systems and more particularly to a system of the null-balance type wherein a standard potential is used as a comparison with an unknown potential to determine the value of the unknown. This invention constitutes an improvement over the invention disclosed in application Serial No. 509,775, filed May 20, 1955, now Patent Number 2,868,-995, and is a continuation-in-part of copending application Serial No. 542,868, filed October 26, 1955, now abandoned.

Basically, the invention provides means by which a standard or reference potential may be stored in a memory circuit for subsequent comparison to an unknown value of potential. The actual memory element in this case is a charged capacitor which is maintained in its charged condition for extended periods of time.

In order to insure accuracy in the comparison there should be no change in the potential level or charge on the capacitor during the period between the application of the standard charge and the application of the unknown potential for comparison purposes. If a charged capacitor could be placed in a circuit having infinite resistance, it would be possible to maintain the full charge or potential level on the capacitor for an infinite period of time. Although an infinite resistance condition is rendered impossible by dielectric leakage and other loss factors of the capacitor, suitable means may be devised to maintain the capacitor in the deired state of charge over an extended period of time.

Among the objects of this invention are: To provide a simple, efficient and accurate system for comparing two potentials that may occur at a substantial interval of time apart such as several hours or days; to charge a capacitor herein called a memory capacitor by one of the potentials and to maintain automatically the charge applied thereto for an indefinite period of time; to compare the automatically maintained charge on the memory capacitor with a second potential which corresponds to a subject or unknown signal; to employ a bridge circuit having a pair of electric valves in adjacent arms with a galvanometer type measuring means connected across the bridge for measuring the charge on the memory capacitor and for comparing it with the second potential which corresponds to the subject or unknown signal; and to connect another elective valve to the memory capacitor and to one of the electric valves of the bridge circuit in such manner as to compensate automatically for any change, either increase or decrease, in the charge on the memory capacitor as applied by the first potential and thereby maintain the charge substantially constant for an indefinite period of time.

Other objects of this invention will, in part, be obvious and in part appear hereinafter.

This invention is disclosed in the embodiment thereof shown in the accompanying drawings and it comprises the features of construction, combination of elements and arrangement of parts that will be exemplified in the system hereinafter disclosed and the scope of the application of which will be indicated in the appended claims.

For a more complete understanding of the nature and scope of this invention reference can be had to the following detailed description, taken together with the accompanying drawings.

Figure 2:
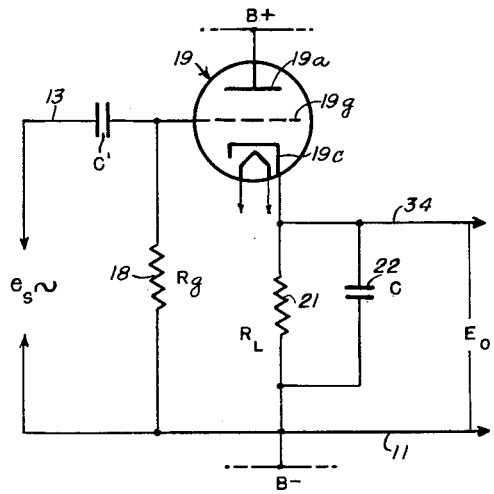
Figure 3:
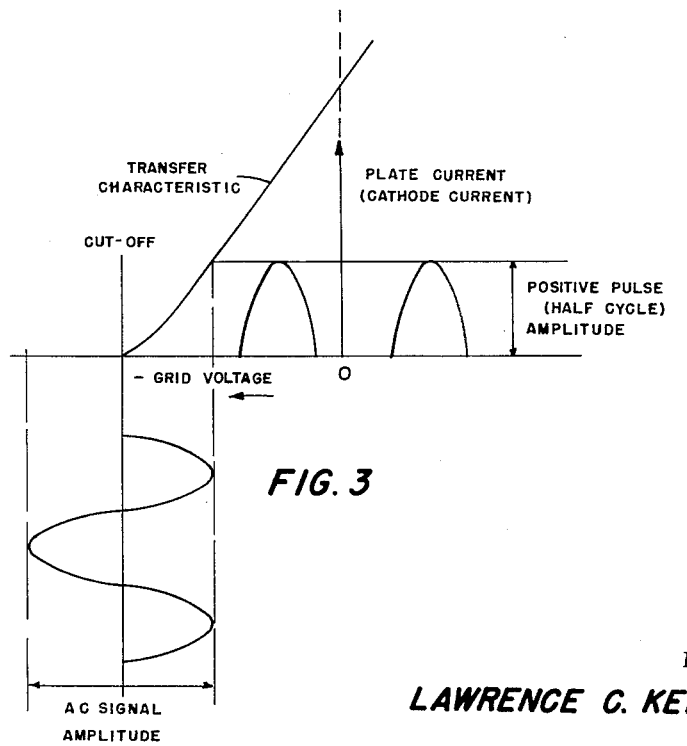

In the drawings:
FIG. 1 shows a preferred embodiment of the present invention.
FIG. 2 shows a cathode follower circuit of the type utilized in the embodiment of FIG. 1.
FIG. 3 shows a graphical representation of the operating characteristics of the circuit of FIG. 2 with respect to alternating current signal inputs.

Referring in detail to the drawings and more particularly to FIG. 1, positive and negative conductors 10 and 11 respectively are shown having the conventional B+ and B— symbols associated therewith. These comprise the common circuit connections. The negative conductor 11 is grounded as indicated.

The general arrangement of circuit components comprises a cathode follower input consisting of an electric valve 19 and associated cathode circuit 20; a bridge circuit 25 for comparing the output of the cathode follower with a standard reference potential; a memory capacitor 35 wherein the reference potential is stored; and a storage circuit comprising a pair of electric valves 27 and 47 interconnected with one another and with the memory capacitors 35 such that changes in the reference potential stored in the memory capacitor 35 are detected thereby and the memory capacitor 35 is automatically recharged to the true value of the reference potential.

In order to effect measurement of an unknown signal with respect to a standard signal, a predetermined reference or potential must first be stored in the memory capacitor 35.

With a view to selectively applying to the measuring system hereinafter described the standard or first signal potential and the second or unknown signal potential a control switch, shown generally at 12, is employed. The control switch is arranged with a switch arm 13 to engage a switch contact 14. It will be noted that the first signal potential, either alternating current or direct current, is indicated at 15 as being applied between the switch contact 14 and the negative conductor 11. Another switch contact 16 is provided for engagement by the switch arm 13. The second signal potential, either alternating current or direct current, is indicated at 17 and it is arranged to be applied between the switch contact 16 and the grounded negative conductor 11. It will be understood that the second signal potential, indicated at 17, may occur several hours or days after the application of the first signal potential between the switch contact 14 and the grounded conductor 11.

Interposed between the switch 13 and the negative conductor 11 is a grid resistor 18 across which the two signal potentials are selectively applied. The switch arm 13 and one terminal of the grid resistor 18 are connected to a grid $19g$ of a first electric valve, shown generally at 19, and in addition provided with an anode $19a$ and a cathode $19c$ which can be indirectly heated. Connected to the cathode $19c$ is a cathode follower circuit that is indicated, generally at 20. It includes a resistor 21 and a capacitor 22 which are connected in parallel circuit relation between the cathode $19c$ and the grounded negative conductor 11.

For the purpose of clarity with respect to alternating current signals FIGS. 2 and 3 are now referred to.

The cathode follower circuit of FIG. 1 is shown in FIG. 2 with the components identically numbered. An alternating signal input $e_s$ is shown between ground conductor 11 and input lead 13. An input capacitor $C'$ is included in the input conductor 13 between the control grid $19g$ of the electric valve 19 and the input signal $e_s$. The input capacitor $C'$ is the only component added to the circuit of FIG. 1 for alternating current signal measurement and may be switched in and out of the line 13 by conventional means not shown.

When measuring an alternating current input some means must be provided to transmit an average or other positive value of signal potential to the measuring means.

If the sizes of the bypass capacitor 22 and the load resistor 21 in the cathode circuit are properly adjusted, the time-constant of the R-C cathode circuit may be made much greater than the time interval required for one-half (½) cycle of the input signal. The optimum relative values of resistance and capacitance are those which provide the desired time-constant and simultaneously bias the electric valve 19 to the cut-off point as is well understood in the art. As a result, an alternating signal applied across input lead 13 and grounded conductor 11 will result in an output between output conductor 34 and ground comprising positive pulses proportional to the positive half cycles of the input signal.

A typical transfer characteristic curve for a circuit of the above-described type is shown in FIG. 3. The transfer characteristic and corresponding cut off point indicated are plotted in combination with grid voltage vs. plate current. With the electric valve biased to cut-off, it is noted that only positive half-cycles of the A.C. signal (plotted on the vertical cut-off line) are amplified. The resultant output signal represented in FIG. 3 by positive pulses (plotted on the horizontal axis) is proportional to the input signal and appears as positive pulses for each positive half cycle of the input signal. These positive output pulses provide an average value of direct current which may be transmitted to the measuring circuit to be hereinafter described.

The following is a representative table of operating values obtained from an actual test hook-up of the circuit of FIG. 2.

(1) Electric valve 19 _____ 6BK7-A triode.
(2) Resistor 21 _____ 47000 ohms.
(3) Capacitor 22 _____ 5 microfarads.
(4) B+ _____ 300 volts D.C.
(5) No-signal cathode voltage _____ 15 volts D.C.

| A.C. input: | v. R.M.S. | D.C. output: | v. D.C. |
|---|---|---|---|
| $e_s$ | 0 | $-E_0$ | 15 |
| $e_s$ | 1 | $-E_0$ | 16 |
| $e_s$ | 2 | $-E_0$ | 16.5 |
| $e_s$ | 3 | $-E_0$ | 17.5 |
| $e_s$ | 4 | $-E_0$ | 18.5 |
| $e_s$ | 5 | $-E_0$ | 19.5 |
| $e_s$ | 6 | $-E_0$ | 20.5 |
| $e_s$ | 7 | $-E_0$ | 21.5 |
| $e_s$ | 8 | $-E_0$ | 22.5 |
| $e_s$ | 9 | $-E_0$ | 23.5 |
| $e_s$ | 10 | $-E_0$ | 24.5 |

Thus, it can be seen that the D.C. output response of the cathode follower circuit is substantially linear with respect to the R.M.S. value of A.C. signal input.

The circuits thus far described are arranged to cooperate with a bridge circuit, indicated generally at 25, which is connected between the conductors 10 and 11, as shown. The bridge circuit 25 has second and third electric valves, shown generally at 26 and 27, in adjacent arms. The electric valve 26 is provided with an anode 26a, a grid 26g and a cathode 26c. Likewise, electric valve 27 is provided with an anode 27a, a control grid 27g and a cathode 27c. For proper operation the gain of each of the electric valves 26 and 27 should be one. The cathodes 26c and 27c are commonly connected through a cathode resistor 28 to the negative grounded conductor 11. The resistor 28 may be any suitable combination of resistors such as delta or Y-connected resistors as will be understood. The bridge circuit 25 includes a potentiometer 29 having a movable contact 29' that is connected to the positive conductor 10. The terminals of the potentiometer 29 are connected through resistors 30 and 31 to the anodes 26a and 27a of the electric valves 26 and 27. Interposed between the anodes 26a and 27a is measuring means in the form of a zero center galvanometer 32 which is connected through a series resistor 33 across the bridge circuit 25. One connection to the bridge circuit 25 from the first electric valve 19 and the cathode circuit 20 thereof is provided through a conductor 34 which interconnects the cathode 19c and the associated cathode circuit 20 to the grid 26g of the second electric valve 26. This connection comprises the input connection to the bridge circuit 25 for the unknown or second signal potential 17.

As pointed out hereinbefore provision is made for storing a charge on a capacitor which corresponds to the magnitude of the first signal potential 15 so that it can be compared later on with the second signal potential 17. For this purpose a memory capacitor 35 is employed. It is connected on one side to the anode 27a of the third electric valve 27. As will be described hereinafter a charge is applied to the memory capacitor 35 which is a function of the magnitude of the first signal potential 15. An important purpose of this invention is to provide for maintaining that charge on the memory capacitor 35 without change until the occurrence of the second signal potential 17. Cooperating with the memory capacitor 35 is a three position switch that is indicated, generally, at 36. The switch 36 has a switch arm 37 which is connected to the other side of the memory capacitor 35. In one position the switch arm 37 engages a calibrate switch contact 38 that is also designated CAL in the drawing. The contact 38 is connected to a junction 39 between resistors 40 and 41 that are connected in series circuit relation between the conductors 10 and 11. The switch arm 37 is arranged to selectively engage a standard switch contact 42 that is also designated as STD on the drawing. A conductor 43 interconnects the contact 42 with the cathode 19c of the first electric valve 19 and thereby provides for applying the charge on the memory capacitor 35 from the first signal potential 15. Intermediate the contacts 38 and 42 is a memory switch contact 44 which is indicated as MEM in the drawing. The contact 44 is not connected in any circuit except that it is engaged by the switch arm 37. It merely represents an open circuit position for the switch arm 37 between the contacts 38 and 42.

For accurate measurement, as pointed out hereinbefore, the charge applied to the memory capacitor 35 should be maintained at the value as applied by the first signal potential 15. It should not increase or decrease. In accordance with this invention provision is made for automatically maintaining the charge on the capacitor 35 and for this purpose a fourth electric valve, shown generally at 47, is employed. It includes an anode 47a, a control grid 47g and a cathode 47c. The grid 47g of the electric valve 47 is connected directly to the other side of the memory capacitor 35. The cathode 47c is connected through a cathode resistor or potentiometer 48 to the negative conductor 11. A conductor 49 interconnects the control grid 27g of the third electric valve 27 and a movable tap 50 along the resistor or potentiometer 48, as shown.

In the event that it is desired to make use of the voltage which appears across the bridge circuit 25 between the anodes 26a and 27a for control or other purposes, conductors 52 and 53 are connected thereto, as shown. The potential that appears across the conductors 52 and 53 can be employed for operating automatic control mechanisms, as will be readily understood, to effect certain control functions depending upon the magnitude of the first signal potential 15 or of the second signal potential 17 or for automatically adjusting one of these potentials as may be required.

With neither of the signal potentials 15 nor 17 applied and with the switch arm 37 out of contact with contacts 38 and 42, the bridge circuit 25 is balanced by adjusting the position of the contact 29' of the potentiometer 29 until the galvanometer 32 reads zero. Then the switch arm 37 of the three position switch 36 is moved to the CAL position in engagement with contact 38 and the first signal potential 15 is applied and is adjusted to a value equal to the potential across the resistor 41 with the galvanometer 32 again reading zero. The system now is calibrated properly and is ready to receive a charge on the memory capacitor 35 which is a function of the first signal potential 15.

In operation, after having made the foregoing adjustments, the switch arm 37 is moved to the STD position in engagement with the contact 42. As described above, the plate or anode 27a of the third electric valve 27 is connected to the control grid 47g of the fourth electric valve 47 through the memory capacitor 35. The variable tap 50 on the cathode resistor 48 of the fourth electric valve 47 is adjusted such that any change in the potential of the cathode 47c is directly reproduced at the control grid 27g of the third electric valve 27. The gain of the second, third and fourth electric valves is equal, respectively, to unity both for purposes of balancing the bridge circuit 25 and for the purpose of reflecting equal magnitudes of potential change between all of the elements of the electric valves.

Any potential change at the control grid 47g, or in other words a change in the potential difference across the memory capacitor 35 between the anode 27a of the electric valve 27 and the grid 47g of the electric valve 47, is directly reproduced at the cathode 47c and the control grid 27g as described above.

The change in potential on the control grid 27g produces an equal and opposite change of potential on the anode 27a. Thus, the potential changes at the anode 27a and the control grid 47g are equal and opposite and algebraically added to the potential difference already in existence between the anode 27a and the control grid 47g across the memory capacitor 35. Since the potential changes are equal and opposite, the algebraic sum of the changes is zero and the original potential difference across the memory capacitor 35 is unchanged.

Now it will be assumed that the second signal potential 17 is applied with the switch arm 13 in the alternate position in engagement with the switch contact 16. If this potential is greater than the first potential 15, as remembered by the memory capacitor 35 by virtue of the charge maintained thereon as described, the galvanometer 32 will indicate the degree of difference by having its pointer moved to the right of the zero position. Conversely, if the second signal potential 17 is less than the first signal potential 15, as remembered by the memory capacitor 35, the galvanometer 32 will indicate this by its pointer swinging to the left of the zero position. Now if the second signal potential 17 is adjusted, for example by automatic adjusting means under the control of the potential applied across the conductors 52 and 53, to be equal to the first signal potential 15, the galvanometer 32 will again register zero. The two signal potentials 15 and 17 will be of equal magnitude.

It will be understood that the cathode follower circuit 20, connected to the cathode 19c of the first electric valve 19 has a potential existing across the resistor 21 when no signal is applied to the control grid 19g. In the system described provision is made for compensating for this potential in such manner that it does not add to the signal potentials 15 and 17 and result in erroneous indications. In the system disclosed this constant potential is added to the signal potential 15 when it is standardized with the switch 36 in the STD position. Now, when the switch 36 is in the MEM position and the second signal potential 17 is applied, the memorized constant potential is opposed by the constant potential at the cathode 19c of the first electric valve 19 and applied to the control grid 26g of the second electric valve 26 and they cancel each other thereby allowing the galvanometer 32 of the bridge circuit 25 to indicate the difference between the second signal potential 17 and the first signal potential 15.

Since certain changes can be made in the foregoing system and different embodiments of the invention can be made without departing from the spirit and scope thereof, it is intended that all matter shown in the accompanying drawing and described hereinbefore shall be interpreted as illustrative and not in a limiting sense.

I claim:

1. In a measuring system for the comparison of a standard signal potential to other signal potentials, in combination, a cathode follower input circuit for said signal potentials, a bridge circuit for comparing said other signal potentials to said standard signal potential and a storage circuit for said standard signal potential for automatically maintaining a fixed value thereof, said bridge circuit being connected on one side to said cathode follower circuit and on the other side to said storage circuit, and means for disconnecting said storage circuit from said standard signal potential whereby said other signal potential can be compared with the potential of said storage circuit corresponding to said standard potential.

2. A system for comparing first and second signal potentials comprising, in combination, a memory capacitor, means for charging said memory capacitor by application thereto of said first potential, means for disconnecting said memory capacitor from said first signal potential and leaving it charged at said first signal potential, a bridge circuit including a pair of electric valves connected to said memory capacitor for continuously measuring the charge applied thereto, an additional electric valve connected to said memory capacitor and cooperating with one of said pair of valves for maintaining automatically the charge applied to said memory capacitor after removal therefrom of said first potential, and means for applying said second potential to the other of said pair of valves to compare the same with the charge maintained on said memory capacitor.

3. A system for comparing first and second signal potentials comprising, in combination, a memory capacitor, means for charging said memory capacitor by application thereto of said first potential, means for disconnecting said memory capacitor from said first signal potential and leaving it charged at said first signal potential, a bridge circuit including a pair of electric valves connected to said memory capacitor for continuously measuring the charge applied thereto, and means connected across said bridge circuit for providing an indication of the charge on said capacitor, an additional electric valve connected to said memory capacitor and cooperating with one of said pair of valves for maintaining automatically the charge applied to said memory capacitor after removal therefrom of said first potential, and means for applying said second potential to the other of said pair of valves to compare the same by said indicating means with the charge maintained on said memory capacitor.

4. A system for comparing first and second signal potentials comprising, in combination, circuit means providing a unidirectional potential; a bridge circuit connected across said circuit means including a pair of electric valves, each having an anode, a cathode and a control grid with their cathodes connected through cathode resistor means to one side of said circuit means and their anodes individually connected through resistors to the other side of said circuit means, and measuring means connected between said anodes; another electric valve having an anode, a cathode and a control grid connected in series with a cathode resistor and across said circuit means; means interconnecting the grid of one of said pair of electric valves and the cathode of said other electric valve; a memory capacitor interconnected between the anode of said one of said pair of electric valves and the control grid of said other electric valve; means for applying a charge to said memory capacitor corresponding to said first potential, and means for independently applying a control potential to the grid of the other of said pair of valves corresponding to said second potential.

5. A system for comparing first and second signal potentials comprising, in combination, circuit means providing a unidirectional potential; a bridge circuit connected across said circuit means including a pair of electric valves, each having a gain of one and each having an anode, a cathode and a control grid with their cathodes connected through cathode resistor means to one side of said circuit means and their anodes individually connected through resistors to the other side of said circuit means, and zero center measuring means connected between said anodes; another electric valve having an anode, a cathode and a control grid connected in series with a cathode resistor and across said circuit means; means interconnecting the grid of one of said pair of electric valves and the cathode of said other electric valve; a memory capacitor interconnected between the anode of said one of said pair of electric valves and the control grid of said other electric valve; means for energizing the grids of said valves and charging said memory capacitor at a potential corresponding to said first potential, and means for energizing the grid of the other of said pair of valves independently of said first potential at a potential corresponding to said second potential.

6. A system for comparing first and second signal potentials comprising, in combination, circuit means providing a unidirectional potential; a first electric valve having an anode, a cathode and a control grid connected in series with a cathode follower circuit including a resistor and a capacitor in parallel therewith, said valve and series connected cathode follower circuit being connected across said circuit means; means for selectively applying said first and second signal voltages to said control grid; a bridge circuit connected across said circuit means including second and third electric valves, each having an anode, a cathode and a control grid with their cathodes connected through cathode resistor means to one side of said circuit means and their anodes individually connected through resistors to the other side of said circuit means, and measuring means connected between said anodes; means interconnecting the cathode of said first electric valve and the control grid of said second electric valve; a fourth electric valve having an anode, a cathode and a control grid connected in series with a cathode resistor and across said circuit means; means interconnecting the grid of said third electric valve and the cathode of said fourth electric valve; a memory capacitor interconnected between the anode of said third electric valve and the control grid of said fourth electric valve; and a switch for selectively connecting the control grid of said fourth electric valve to the cathode of said first electric valve.

7. A system for comparing first and second signal potentials comprising, in combination, circuit means providing a unidirectional potential; a first electric valve having an anode, a cathode and a control grid connected in series with a cathode follower circuit including a resistor and a capacitor in parallel therewith, said valve and series connected cathode follower circuit being connected across said circuit means; a grid resistor connected between said control grid and one side of said circuit means; means for selectively applying said first and second signal voltages across said grid resistor to said control grid; a bridge circuit connected across said circuit means including second and third electric valves, each having a gain of one and each having an anode, a cathode and a control grid with their cathodes connected through cathode resistor means to said one side of said circuit means and their anodes individually connected through resistors to the other side of said circuit means, and measuring means connected between said anodes; means interconnecting the cathode of said first electric valve and the control grid of said second electric valve; a fourth electric valve having an anode, a cathode and a control grid connected in series with a cathode resistor and across said circuit means; means interconnecting the grid of said third electric valve and the cathode of said fourth electric valve; a memory capacitor interconnected between the anode of said third electric valve and the control grid of said fourth electric valve; and a switch for selectively interconnecting the control grid of said fourth electric valve to the cathode of said first electric valve.

8. A system for comparing first and second signal potentials comprising, in combination, circuit means providing a unidirectional potential; a first electric valve having an anode, a cathode and a control grid connected in series with a cathode follower circuit including a resistor and a capacitor in parallel therewith, said valve and series connected cathode follower circuit being connected across said circuit means; a grid resistor connected between said control grid and one side of said circuit means; means for selectively applying said first and second signal voltages across said grid resistor to said control grid; a bridge circuit connected across said circuit means including second and third electric valves, each having a gain of one and each having an anode, a cathode and a control grid with their cathodes connected through cathode resistor means to said one side of said circuit means and their anodes individually connected through resistors to the other side of said circuit means, and zero center measuring means connected between said anodes; means interconnecting the cathode of said first electric valve and the control grid of said second electric valve; a fourth electric valve having an anode, a cathode and a control grid connected in series with a cathode resistor and across said circuit means; means interconnecting the grid of said third electric valve and the cathode of said fourth electric valve; a memory capacitor interconnected between the anode of said third electric valve and the control grid of said fourth electric valve; a pair of resistors connected in series circuit relation across said circuit means; a three position switch having calibrate, memory and standard positions commonly connected to the control grid of said fourth electric valve; means connecting said switch in the calibrate position to the junction between said pair of resistors, and means connecting said switch in the standard position to the cathode of said first electric valve, said switch in the memory position being unconnected.

References Cited in the file of this patent

UNITED STATES PATENTS

| | | |
|---|---|---|
| 2,588,427 | Stringfield | Mar. 11, 1952 |
| 2,591,053 | Boisblanc | Apr. 1, 1952 |
| 2,613,235 | Grunsky | Oct. 7, 1952 |
| 2,632,886 | Barney | Mar. 24, 1953 |
| 2,798,905 | Graham | July 9, 1957 |
| 2,905,879 | Starr | Sept. 22, 1959 |
| 2,915,705 | Sweet | Dec. 1, 1959 |

UNITED STATES PATENT OFFICE
CERTIFICATE OF CORRECTION

Patent No. 2,993,171                                    July 18, 1961

Lawrence C. Kelsey

It is hereby certified that error appears in the above numbered patent requiring correction and that the said Letters Patent should read as corrected below.

Column 1, line 36, for "deired" read -- desired --; line 53, for "elective" read -- electric --; column 2, line 49, after "switch" insert -- arm --;

Signed and sealed this 16th day of January 1962.

(SEAL)
Attest:

ERNEST W. SWIDER                                DAVID L. LADD
Attesting Officer                                   Commissioner of Patents